Figures 1, 2:
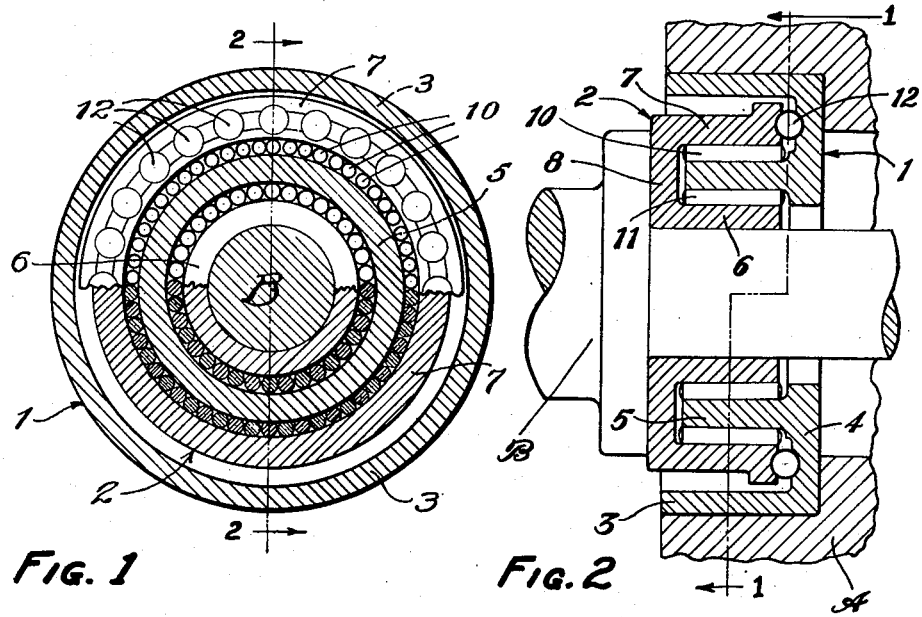

Nov. 22, 1949 V. PALUMBO 2,488,825
ANTIFRICTION BEARING
Filed Oct. 22, 1945 2 Sheets—Sheet 1

INVENTOR.
Vincent Palumbo
BY
Hull & West
ATTYS.

Nov. 22, 1949   V. PALUMBO   2,488,825
ANTIFRICTION BEARING
Filed Oct. 22, 1945   2 Sheets-Sheet 2

INVENTOR.
Vincent Palumbo
BY
Hull & West
ATTYS.

Patented Nov. 22, 1949

2,488,825

UNITED STATES PATENT OFFICE 2,488,825

ANTIFRICTION BEARING

Vincent Palumbo, Cleveland Heights, Ohio

Application October 22, 1945, Serial No. 623,625

9 Claims. (Cl. 308—183)

My invention relates to anti-friction bearings, essentially of the radial class—that is to say, of the class or type in which all, or the major part of the load is exerted in a direction radially of the bearing. A simple example is a conventional ball bearing supporting a horizontal shaft.

In prevailing bearings of this kind, whether balls, or rotating bearing elements of other types, are employed, the entire load is sustained by the few such elements occurring at any given moment on the loaded side of the bearing—which, in the above example, is the lower side—while the remainder of said elements, distributed at the moment about the unloaded side, perform no work.

It is the primary object of my invention to produce an anti-friction bearing of the above mentioned class wherein the load is distributed substantially throughout the circumference of the bearing. Considering, for introductory purposes, a simple form of my invention, the foregoing object is attained by forming one of the bearing members with an annular channel that is concentric with the axis of the bearing, and the other member with an annular flange extending into said channel, and interposing between the outer surface of said flange and the opposed wall of the channel one annular series of row of rotating bearing elements, and between the inner surface of said flange and the wall of the channel opposed thereto a second annular series or row of rotating bearing elements, said inner and outer surfaces of the flange and said opposed walls of the channel constituting the races for said bearing elements. As a consequence of this arrangement, the load is divided substantially equally between the rotating bearing elements of one row that are adjacent the upper side of the bearing, and the rotating bearing elements of the other row that are adjacent the lower side of the bearing.

Another object of the invention is to increase the load sustaining capacity of such a bearing as that just described by multiplying the rows of rotating bearing elements and the parts of the bearing members wherewith said elements cooperate.

A further object is to incorporate one or more thrust bearings in a radial bearing characterized by a load sustaining function substantially coextensive with the circumference of the bearing.

Still further and more general objects are to provide a construction that expedites manufacture; that facilitates assembly; that imparts strength to the load sustaining parts of the bearing, and that increases the life and efficiency of bearings of the beforementioned class.

Other objects and advantages will appear as I proceed to describe the invention by reference to the accompanying drawings wherein similar characters designate similar parts throughout the several views.

Figures 3, 4:
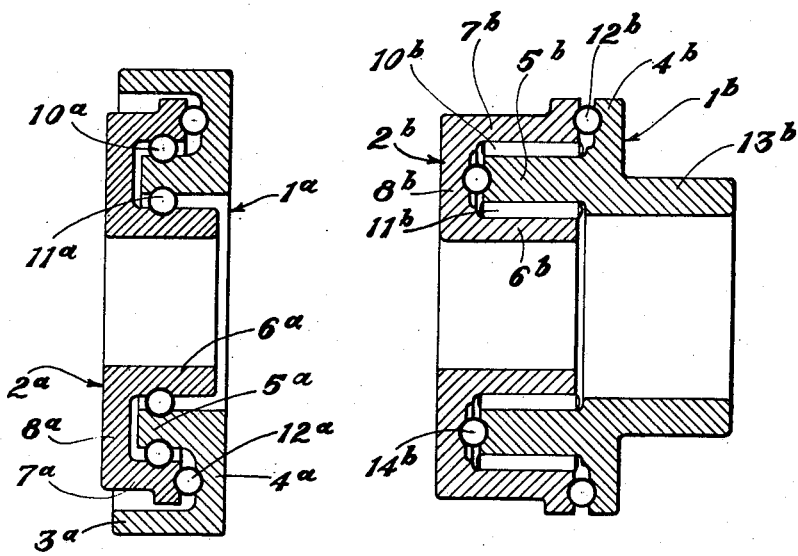
Figure 5:
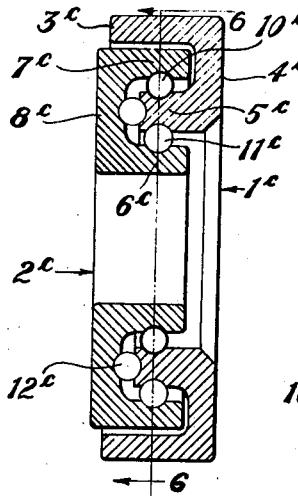
Figure 7:
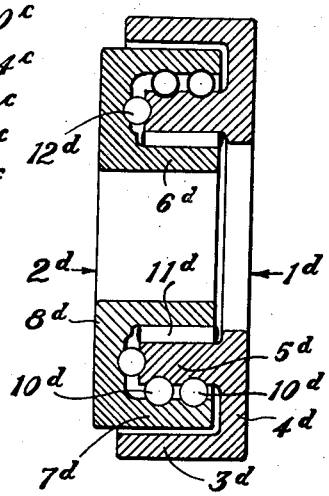
Figure 8:
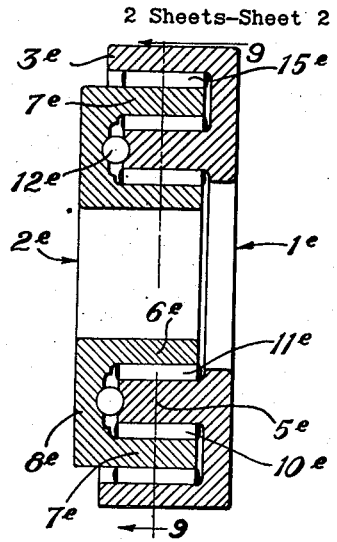
Figure 9:
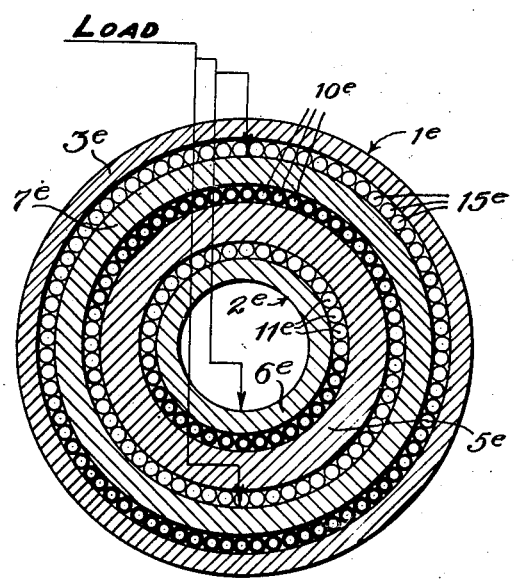
Figure 6:
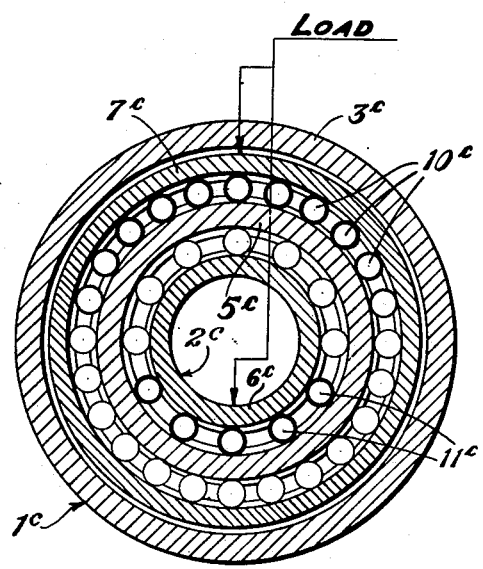

In the drawings, Fig. 1 represents a transverse section through the bearing in offset planes, as indicated by the line 1—1 of Fig. 2; Fig. 2 is a section on the line 2—2 of Fig. 1, the present view including a fragment of a support for the non-rotating member of the bearing, and a portion of a shaft that is sustained by the rotating bearing member; Figs. 3, 4 and 5 are sectional views, each showing a different modification of the invention; Fig. 6 is a section on the line 6—6 of Fig. 5; Figs. 7 and 8 are sectional views showing two further modifications, and Fig. 9 is a section on the line 9—9 of Fig. 8.

My improved bearing, in the form illustrated in Figs. 1 and 2, comprises members designated, generally, by the reference numerals 1 and 2, the former, according to the installation illustrated in Fig. 2, being the non-rotating member, inasmuch as it is fitted into a recess of a stationary support A, which may be the frame or housing of a machine, while the latter is the rotating member and supports a shaft B. The member 1 comprises a peripheral wall 3, shown as cylindrical, an annular wall 4 that extends inwardly from one end of the former wall, and a flange 5 that projects in the same direction from the wall 4 as the peripheral wall 3 and is in concentric, spaced relation thereto. The member 2 consists of inner and outer cylindrical walls 6 and 7, respectively, that are connected together by an annular wall 8, said walls defining a channel in the member 2 into which extends the flange 5 of member 1.

An annular series or row of rotating bearing elements 10, shown as rollers of relatively small diameter, is interposed between the outer side of the flange 5 and the opposed cylindrical surface of the wall 7, and a second annular series or row of similar rotating bearing elements 11 is interposed between the inner side of the flange 5 and the opposed cylindrical surface of the wall 6. While the rollers of each series or row are shown close together, they may be reduced in number and maintained in spaced relation to each other by the use of end rings or a cage, according to common practice.

It is evident from the construction above described that the load, which consists principally of the weight of the shaft B, bears, in part, on those elements 11 of the inner row that are beneath the lower half of the walls 6, and, through them, on the underlying part of the flange 5, while the remainder of the load, communicated thereto through the walls 8 and 7 of the member 2, bears on the elements 10 of the outer series or row that are beneath the upper half of the wall 7, and, through them, on the remaining part of the flange 5.

An end thrust bearing is provided in the present construction by an annular series of rotating bearing elements or balls 12 that operate in grooves in the wall 4 of the member 1 and the flanged end of the wall 7 of member 2. A conventional cage may be employed to maintain the elements 12 in spaced relation, if desired.

In describing the modifications of the invention illustrated in Figs. 3 to 9, I shall designate the parts thereof by the same reference numerals used to indicate the corresponding parts of the first described form, adding thereto, in each instance, a different exponent.

The bearing illustrated in Fig. 3 is made to differ from that shown in Figs. 1 and 2 principally by the substitution of balls $10^a$ and $11^a$ for the rollers 10 and 11. The bearing members are designated $1^a$ and $2^a$, respectively, the former including the peripheral wall $3^a$ and the flange $5^a$ that are connected together by the annular wall $4^a$, and the latter including the cylindrical walls $6^a$ and $7^a$ that are connected together by the annular wall $8^a$. The opposed surfaces of the flange $5^a$ and wall $6^a$ and $7^a$ are grooved to provide races for the balls $10^a$ and $11^a$. Between the enlarged or flanged end of the wall $7^a$ and the opposed annular wall $4^a$ are the rotating bearing elements or balls $12^a$ that constitute the thrust bearing and operate in grooves of said walls.

In the construction illustrated in Fig. 4, the bearing member $1^b$ consists of a radial wall $4^b$ from which extends, in one direction, a cylindrical flange $5^b$, and in the other direction, a hub $13^b$. The other bearing member, designated $2^b$, has an annular channel defined by the walls $6^b$, $7^b$ and $8^b$, into which the flange $5^b$ extends, and between said flange and the respective walls $7^b$ and $6^b$ are the annular series or rows of rotating bearing elements or rollers $10^b$ and $11^b$. Within races consisting of shallow grooves in the enlarged or flanged end of the wall $7^b$ and the wall $4^b$ are rotating bearing elements or balls $12^b$ that constitute one thrust bearing, and a second thrust bearing is provided by an annular series or row of bearing elements or balls $14^b$ that operate within races formed by grooves in the wall $8^b$ and the adjacent end of the flange $5^b$.

The bearing shown in Fig. 5 is quite similar to the form illustrated in Fig. 3, and it consists of the members $1^c$ and $2^c$, the former comprising a peripheral wall $3^c$, the annular flange $5^c$ and the radial wall $4^c$ that connects said flange and the peripheral wall. The member $2^c$ comprises inner and outer cylindrical walls $6^c$ and $7^c$ that are connected by the radial wall $8^c$, between the inner grooved side of which and the grooved end of the flange $5^c$ is an annular series of rotating bearing elements or balls $12^c$ that constitute the thrust bearing. Outer and inner rows of rotating bearing elements or balls $10^c$ and $11^c$, respectively, operate between the opposite sides of the flange $5^c$ and the inner and outer cylindrical walls of the member $2^c$.

Assuming, as in the first described form of the invention, that the load is carried by the member $2^c$, it is evident that the load is divided between the rotating bearing elements $10^c$ that are beneath the upper half of the wall $7^c$ while the remainder of the load is imposed upon the elements $11^c$ that are distributed about the lower half of wall $6^c$. This distribution of the load is clearly brought out in the somewhat diagrammatic sectional view of Fig. 6, where the loaded rotating bearing elements of the inner and outer rows are distinguished from the unloaded elements by their being shown in heavy outline.

In the modification illustrated in Fig. 7, two rows of balls $10^d$ are interposed between the outer side of the flange $5^d$ and the inner side of the wall $7^d$, while rollers $11^d$ form the inner row of rotating bearing elements that operate between the inner side of said flange and the opposed surface of the cylindrical wall $6^d$. Balls $12^d$, that provide the thrust bearing, operate within grooves in the opposed surfaces of the wall $8^d$ and the flange $5^d$.

In the bearing of Fig. 8 an extra row of rotating bearing elements $15^e$, shown as cylindrical rollers, operate between the outer side of the cylindrical wall $7^e$ of the bearing member $2^e$ and the inner surface of the peripheral wall $3^e$ of the bearing member $1^e$. In the present case, the rotating bearing elements or balls $12^e$ that sustain the end thrust operate between the end of the flange $5^e$ and the opposed portion of the radial wall $8^e$, while inner and outer rows of rotating bearing elements or rollers $11^e$ and $10^e$ are disposed between the inner and outer sides of flange $5^e$ and the opposed walls $6^e$ and $7^e$. The distribution of the load, in this case, is graphically illustrated by the heavy line circles that represent the loaded rotating bearing elements in Fig. 9, this view being a section on the line 9—9 of Fig. 8.

This application is a companion to one entitled "Anti-friction bearings of the angle type," filed on the same day herewith, and bearing Serial No. 623,624. While the bearings that form the subject matter of the two applications are of different types, they embody the same principle in that the load sustaining function prevails throughout substantially the entire circumference of the bearing.

Having thus described my invention, what I claim is:

1. A self-contained anti-friction bearing comprising a member having an annular channel that opens in an axial direction through the side of the member and is concentric with the axis of the bearing, a second member including an annular flange that extends in an axial direction into said channel in spaced relation to the inner and outer walls thereof, a row of rotating bearing elements between and practically entirely within the area of the outer side of said flange and the opposed wall of the channel, a second row of rotating bearing elements between and practically entirely within the area of the inner side of said flange and the wall of the channel opposed thereto, said flange and the inner and outer walls of the channel each being rigid so as to unyieldingly sustain radial load, each of said members consisting of an integral unit including a thrust bearing race lying in a plane normal to the axis of the bearing, the thrust bearing races of the two members being arranged in opposed relation to each other when the bearing is assembled by relative coaxial movement of the members toward each other, and a series of rotating bearing elements between said thrust bearing races.

2. A self-contained anti-friction bearing comprising a member having a side opening annular channel that is concentric with the axis of the bearing, a second member including an annular flange that extends into said channel in spaced relation to the inner and outer walls thereof, a row of rotating bearing elements between and practically entirely within the area of the outer side of said flange and the opposed wall of the channel, a second row of rotating bearing elements between and practically entirely within the area of the inner side of said flange and the wall of the channel opposed thereto; said flange and the inner and outer walls of the channel each being rigid so as to unyieldingly sustain radial load, each of said members including a plurality of thrust bearing races, each lying in a plane normal to the axis of the bearing and arranged in opposed relation to one of the thrust bearing races of the other member when the bearing is assembled by relative coaxial movement of the members toward each other, and a series of rotating bearing elements between the corresponding thrust bearing races of the two members.

3. In an anti-friction bearing, a member comprising a radial wall occupying a plane substantially normal to the axis of the bearing, and a rigid annular radial-load sustaining flange extending from said wall in concentric relation to said axis, a second member comprising rigid inner and outer radial-load sustaining walls having opposed bearing surfaces, and a radial wall connecting the corresponding ends of said inner and outer walls thereby to form an annular channel, the aforesaid flange of the first mentioned member extending into said channel, a row of rotating bearing elements between and practically entirely within the area of the outer side of said flange and the opposed bearing surface of said outer wall, a second row of rotating bearing elements between and practically entirely within the area of the inner side of said flange and the opposed bearing surface of said inner wall, the end of said outer wall being in opposed spaced relation to a part of the radial wall of the first mentioned member, and a row of rotating bearing elements between said end and said part.

4. In an anti-friction bearing, a member comprising a radial wall occupying a plane substantially normal to the axis of the bearing, and a rigid annular radial-load sustaining flange extending from said wall in concentric relation to said axis, a second member comprising rigid inner and outer radial-load sustaining walls having opposed cylindrical surfaces, and a radial wall connecting the corresponding ends of said inner and outer walls thereby to form an annular channel, the aforesaid flange of the first mentioned member extending into said channel, a row of balls between the outer side of said flange and the opposed cylindrical surface of said outer wall, and a second row of balls between the inner side of said flange and the cylindrical surface of said inner wall, the opposite sides of the flange and the opposed cylindrical surfaces of said inner and outer walls being grooved to provide races for the balls of the two rows.

5. In an anti-friction bearing, a member comprising a wall disposed in a plane substantially normal to the axis of the bearing, and a rigid annular radial-load sustaining flange projecting from said wall in concentric relation to said axis, a second bearing member comprising a rigid inner radial-load sustaining wall, a rigid outer radial load sustaining wall, and a radial wall connecting the corresponding ends of the inner and outer walls thereby to provide a channel, the aforesaid flange of the first member projecting into said channel, an annular series of rotating bearing elements between the end of said flange and the radial wall of the second member, an annular series of rotating bearing elements between and practically entirely within the area of the outer side of the flange and the outer wall of the second member, and an annular series of rotating bearing elements between and practically entirely within the area of the inner side of said flange and the inner wall of said second member.

6. In an anti-friction bearing, a member comprising a wall disposed in a plane substantially normal to the axis of the bearing, a peripheral wall and a rigid annular radial-load sustaining flange spaced inwardly therefrom, both said wall and said flange projecting in an axial direction from the first mentioned wall with said flange concentric with the axis of the bearing, a second member comprising a rigid inner radial-load sustaining wall, a rigid outer radial-load sustaining wall, and a radial wall connecting the corresponding ends of said inner and outer walls thereby to define a channel, the aforesaid flange projecting into said channel while the outer wall of the second member is located inside the peripheral wall of the first member, a row of rotating bearing elements between and practically entirely within the area of the outer side of said flange and the outer wall of the second member, a second row of rotating bearing elements between and practically entirely within the area of the inner side of said flange and the inner wall of the second member, and an annular series of rotating bearing elements between the end of the outer wall of the second member and the opposed part of the first mentioned wall of the first member.

7. In an anti-friction bearing, a member comprising a wall disposed in a plane substantially normal to the axis of the bearing, a peripheral wall and a rigid annular radial-load sustaining flange spaced inwardly therefrom, both said wall and said flange projecting in an axial direction from the first mentioned wall with said flange concentric with the axis of the bearing, a second member comprising a rigid inner radial-load sustaining wall, a rigid outer radial-load sustaining wall, and a radial wall connecting the corresponding ends of said inner and outer walls thereby to define a channel, the aforesaid flange projecting into said channel while the outer wall of the second member is located inside the peripheral wall of the first member, a row of rotating bearing elements between and practically entirely within the area of the outer side of said flange and the outer wall of the second member, a second row of rotating bearing elements between and practically entirely within the area of the inner side of said flange and the inner wall of the second member, and an annular series of rotating bearing elements between the end of said flange and the opposed part of the radial wall of the second member.

8. In an anti-friction bearing, a member comprising a wall disposed in a plane substantially normal to the axis of the bearing, a peripheral wall and a rigid annular radial-load sustaining flange spaced inwardly therefrom, both said wall and said flange projecting in an axial direction from the first mentioned wall and said flange being concentric with the axis of the bearing, a second member comprising a rigid inner radial-load sustaining wall, a rigid outer radial-load sustaining wall, and a radial wall connecting the corresponding ends of said inner and outer walls thereby to define a channel, the aforesaid flange projecting into said channel while the outer wall of the second member is located inside the peripheral wall of the first member, a row of rotating bearing elements between and practically entirely within the area of the outer side of said flange and the outer wall of the second member, a second row of rotating bearing elements between and practically entirely within the area of the inner side of said flange and the inner wall of the second member, the exterior surface of the outer wall of the second member, and the interior surface of the peripheral wall of the first member constituting opposed races, and a row of rotating bearing elements between said races.

9. An anti-friction bearing comprising two members, one member having a plurality of races facing radially inwardly and a race facing radially outwardly, and the other member having a corresponding plurality of radially outwardly facing races and a radially inwardly facing race, all races being concentric with the axis of the bearing, the members being so arranged that an outwardly facing race of each member is in radially opposed relation to an inwardly facing race of the other member, and a row of rotating radial-load sustaining bearing elements between each race of one member and the opposed race of the other member.

VINCENT PALUMBO.

REFERENCES CITED

The following references are of record in the file of this patent:

UNITED STATES PATENTS

| Number | Name | Date |
|---|---|---|
| 434,480 | Simonds | Aug. 19, 1890 |
| 633,053 | St. Louis | Sept. 12, 1899 |
| 792,559 | Stechbarth | June 13, 1905 |
| 945,806 | Rhodes | Jan. 11, 1910 |
| 949,928 | Grooms | Feb. 22, 1910 |
| 1,800,564 | O'Connor | Apr. 14, 1931 |
| 1,804,600 | Edson | May 12, 1931 |
| 2,337,511 | Wahlmark | Dec. 21, 1943 |

FOREIGN PATENTS

| Number | Country | Date |
|---|---|---|
| 210,527 | Germany | June 1, 1909 |
| 14,179 | France (Add. to 373,314) | Sept. 27, 1911 |